(12) United States Patent
Tamura

(10) Patent No.: US 8,751,944 B2
(45) Date of Patent: Jun. 10, 2014

(54) COMMUNICATION SYSTEM, COMMUNICATION APPARATUS, COMMUNICATION PROGRAM, AND COMPUTER-READABLE STORAGE MEDIUM STORED WITH THE COMMUNICATION PROGRAM

(75) Inventor: Keigo Tamura, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 697 days.

(21) Appl. No.: 12/140,360

(22) Filed: Jun. 17, 2008

(65) Prior Publication Data
US 2009/0024703 A1   Jan. 22, 2009

(30) Foreign Application Priority Data
Jul. 19, 2007 (JP) ................ 2007-188109

(51) Int. Cl.
*G06F 3/00* (2006.01)

(52) U.S. Cl.
USPC .................... 715/758; 715/706; 715/753

(58) Field of Classification Search
USPC ......................... 715/706, 753, 758
See application file for complete search history.

(56) References Cited

U.S. PATENT DOCUMENTS

| | | | |
|---|---|---|---|
| 7,698,648 B2 * | 4/2010 | Rollin et al. | 715/758 |
| 2002/0181739 A1 * | 12/2002 | Hallowell et al. | 382/100 |
| 2005/0208962 A1 * | 9/2005 | Kim | 455/550.1 |
| 2006/0145944 A1 * | 7/2006 | Tarlton et al. | 345/2.3 |
| 2006/0259239 A1 * | 11/2006 | Nouri | 701/211 |
| 2007/0182999 A1 * | 8/2007 | Anthony et al. | 358/452 |
| 2010/0188566 A1 * | 7/2010 | Oku | 348/441 |

FOREIGN PATENT DOCUMENTS

JP   2003-006132   10/2003

OTHER PUBLICATIONS

Amit Agarwal (hereinafter Agarwal), Add Picture Frames to Your Digital Photos Online (Sep. 28, 2007). http://labnol.blogspot.com/2007/09/add-picture-frames-to-your-digital.html.*

* cited by examiner

*Primary Examiner* — Amy Ng
*Assistant Examiner* — Di Xiao
(74) *Attorney, Agent, or Firm* — Matthew B. Dernier, Esq.; Gibson & Dernier LLP

(57) ABSTRACT

The client apparatus 1 is connected to a network and includes a communication packet reception unit 13 and a texture processing unit 18. The communication packet reception unit 13 receives image data, audio data, and image type information designating type of the image data, which are transmitted from another client apparatus connected to the network. The texture processing unit 18 renders an image for the received image data. Moreover, the texture processing unit 18 subjects the image for the image data to a predetermined processing when the image type information received by the communication packet reception unit 13 is information of a predetermined image.

9 Claims, 9 Drawing Sheets

FIG. 6

```
MESSAGE
    DESTINATION    NO. XXX3
    SUBJECT        INVITATION TO CHAT
                   MAY 1, 2006
    TEXT           SHALL WE CHAT?

ATTACHMENTS

[TRANSMIT]
```

FIG. 7

```
MESSAGE
    SENDER         XXXXXX
    DESTINATION    NO. XXX3
    SUBJECT        INVITATION TO CHAT
                   MAY 1, 2006

TEXT           SHALL WE CHAT?
    ATTACHMENTS

[PARTICIPATE]  [NOT PARTICIPATE]  [REPLY]
```

COMMUNICATION SYSTEM, COMMUNICATION APPARATUS, COMMUNICATION PROGRAM, AND COMPUTER-READABLE STORAGE MEDIUM STORED WITH THE COMMUNICATION PROGRAM

BACKGROUND OF THE INVENTION

1. Field of the Invention

The present invention relates to optimum techniques utilized for communication systems of transmitting and receiving image data and audio data among multiple communication apparatus.

2. Description of the Related Art

A voice chat system allowing users to engage in online conversation while displaying avatar images on display screens of respective terminal apparatus, which is attained by transmitting and receiving identification information of the avatar for each user and audio data associated with the identification information among multiple terminal apparatus connected to a network, is known (e.g., refer to Japanese Unexamined Patent Application Publication No. 2003-6132).

SUMMARY OF THE INVENTION

However, the system described above displays only still avatar images on the display screen of each terminal apparatus while voice chatting, naturally ending up with display screens in a monotone state.

The present invention is devised through consideration of the aforementioned problem, and aims to provide a communication system capable of displaying an image that catches a user's interest while voice chatting.

The present invention is a communication system including a first and a second communication apparatus connected to a network. The first communication apparatus includes an audio input unit and a transmitter. The transmitter transmits to the second communication apparatus image data designating a user of the first communication apparatus, audio data for a voice entered from the audio input unit, and image type information designating a type of the image data. The second communication apparatus includes a receiver, a display control unit, and an audio output control unit. The receiver receives image data, audio data, and image type information transmitted from the first communication apparatus. The display control unit displays on a display screen an image for the received image data. The audio output control unit outputs from the audio output unit a voice represented by the audio data received. The display control unit displays on the display screen an image for the image data when the received image type information is information of a specific image.

According to the present invention, an image that catches a user's interest may be displayed while voice chatting.

Artisan will fully understand the above and further objects and features of the present invention by reading a preferred embodiment of the invention described herein in connection with the accompanying drawings, including features recited in the appended claims, as well as explicit and implicit effects and advantages of the invention, including those to be apparent through implementation of the invention.

BRIEF DESCRIPTION OF THE DRAWINGS

FIG. 6 exemplifies a message according to the embodiment;

FIG. 7 exemplifies a message according to the embodiment;

DETAILED DESCRIPTION OF THE PREFERRED EMBODIMENT

Figure 1:
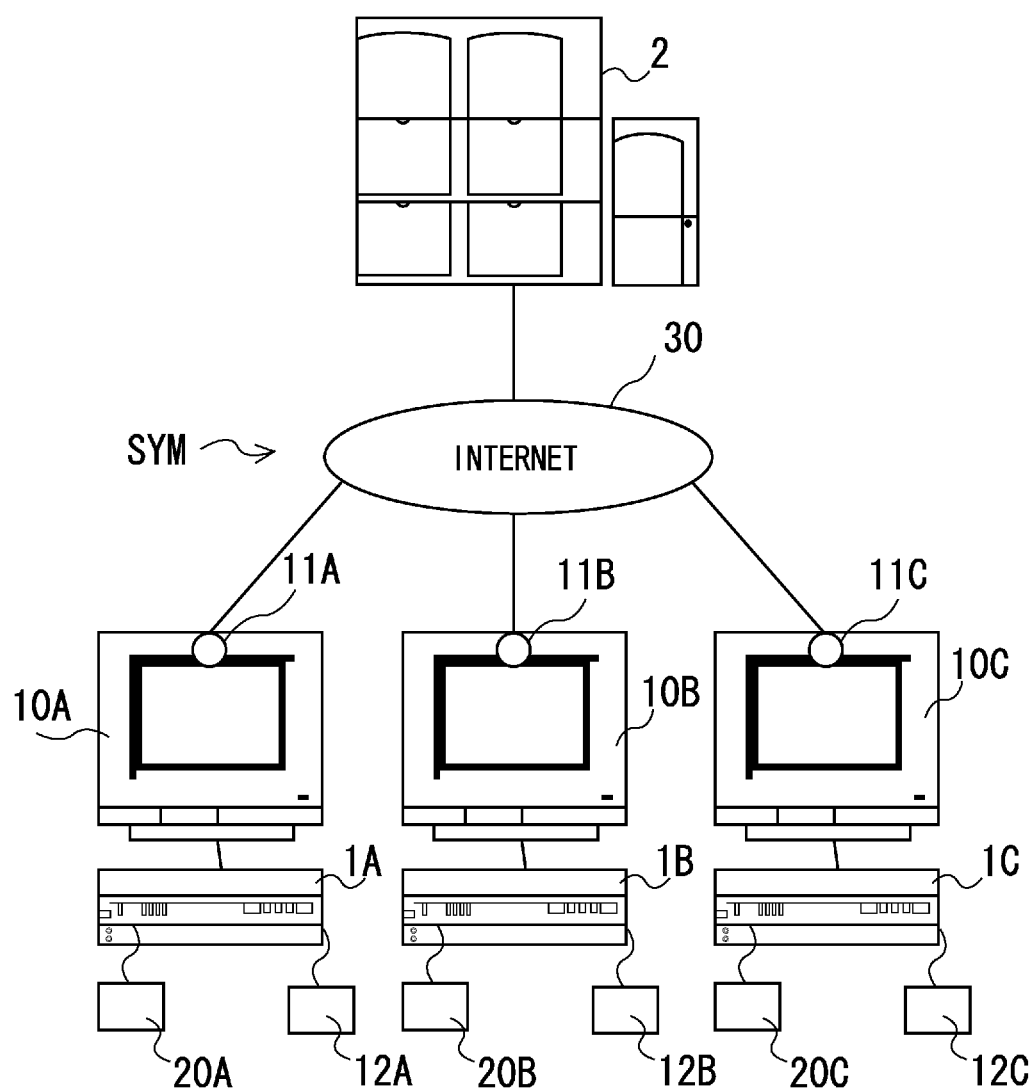
FIG. 1 is a diagram showing an outline of an AV chat system according to an embodiment of the present invention.

A preferred embodiment of the present invention is described below with reference to the accompanying drawings. It is noted that like parts or elements are designated by like reference characters in the drawings, without redundant description of the parts or elements.

Next, an embodiment of the present invention is described with reference to the appended drawings. Note that the same reference numerals are attached to the same respective elements in respective drawings. The embodiment shows only an aspect of the present invention, does not limit the scope of the present invention, and may be modified within the scope of the present invention as needed.

[Embodiment]

(1) Structure

<Structure of Audio Visual (AV) Chat System>

FIG. 1 is a diagram schematically showing an outline of an AV chat system according to an embodiment of the present invention. The AV chat system SYM includes multiple client apparatus 1A, 1B, and 1C and a server apparatus 2. The server apparatus 2 conducts data communication with each of the client apparatus 1 via the Internet 30. The multiple client apparatus 1A, 1B, and 1C communicate with each other using a peer-to-peer (P2P) protocol.

Note that users of respective client apparatus 1A, 1B, and 1C are referred to as users A, B, and C here. Hereafter, the client apparatus 1A, 1B, and 1C are simply referred to as client apparatus 1 when it is unnecessary to distinguish them. In contrast, when the respective client apparatus need to be distinguished from each other and further when components comprising each client apparatus need to be distinguished from each other, A, B, and C are appended at the end of the respective reference numerals.

A controller 20, a monitor 10, a video camera 11, and a microphone 12 are connected to each client apparatus 1 via connection cables, which are not shown in the drawing. The controller 20 is an operation terminal operated by a user, providing an operation signal to the client apparatus 1 in conformity with the user's operation. The video camera 11 provides the client apparatus 1 with a video signal according to a videotaped image. The microphone 12 provides the client apparatus 1 with an audio signal according to an input voice. A video signal is provided to the monitor 10 from the client apparatus 1.

The monitor 10 displays an image according to a video signal provided from the client apparatus 1. Images displayed on the monitor 10 while AV chatting include a self-representing image (hereafter, referred to as self display image) and an image representing a conversation partner (hereafter referred to as partner display image). For example, when the user A of the client apparatus 1A AV chats with the user B of the client apparatus 1B, the monitor 10A displays an image of the user A as a self display image and an image of the user B as a partner display image. In the same manner, the monitor 10B displays the image of the user B as a self display image and the image of the user A as a partner display image.

In each client apparatus 1, type of the self display image is selected and designated from multiple predetermined types by each user. Each client apparatus 1 displays on the monitor 10 the type of image designated and set by the user as a self display image. There are three user-designatable image types: an image (video image) according to a video signal from the video camera 11, an avatar prestored as an image representing the user, and a picture (photo) taken and stored in advance. Note that the user-designatable images may include other types of images than the aforementioned images such as a video taken and stored in advance by the user.

In the aforementioned structure of the AV chat system SYM, the client apparatus 1 of the user participating in an AV chat transmits packetized image data packets (image information) and audio data packets (audio information) one after another as chat streaming data at a predetermined timing to another client apparatus 1 that is participating in the same AV chat.

The image data packets include data of an image (image data) designated as a self display image by the user of each client apparatus 1, image type information, which designates the type of the image data designated as the self display image by the user, and user information, which specifies the user. There are three user-designatable image data types for the self display image: video image data, avatar image data, and picture image data, as described above.

The client apparatus 1 that has received image data packets displays the partner display image in a specific region on the monitor 10 using the image data included in the received image data packets. Here, the data structure of the image data included in the image data packets is common and the same for all types of image data. In other words, the video image data, the avatar image data, and the picture image data all have a common data structure. Standardization of such a data structure allows the client apparatus 1 to execute a common image rendering process and thereby displaying the partner display image in a specific region on the monitor 10 regardless of the image type even if it receives any type of image data as a partner display image. Therefore, standardization of the data structure of the image data described above contributes to provision of a standardized basic image rendering process for the client apparatus 1.

Further, the client apparatus 1 that has received image data packets determines the type of the image data received based on the image type information included in the received image data packets, and then adds an image rendering process for that type to the basic image rendering process described above. More specifically, standardized data structure for image data described above does not allow the client apparatus 1 to determine type of image data from image data received from other client apparatus 1. However, since the image data and the image type information are associated to each other and then transmitted, it is possible to determine type of image data based on the image type information. In the case where the image type information is image data designating a picture, an image rendering process, which adds a square frame around the partner display image (picture), is added to the aforementioned basic image rendering process. In the case where the image type information is image data designating an avatar, an image rendering process, which changes the state (transparency and size) of the partner display image (avatar) according to audio level information described later, is added to the aforementioned basic image rendering process. In the case where the image type information is image data designating a video image, the aforementioned basic image rendering process is executed without particularly adding any special image rendering process.

This makes it possible to display on the monitor 10 the partner display image categorized according to image data type while maintaining the standardized image data structure and the standardized basic image rendering process of the client apparatus 1, resulting in catching the user's interest on the monitor 10.

The audio data packets include audio data of a voice from the microphone 12, user information described above, and audio level information, which designates a detected voice value. The detected voice value denotes an evaluated value representing a relative audio level for a voice input to the microphone 12, where there are ten audio levels (between 1 and 10), and the greater the variation in the input voice, the greater the value (closer to 10). The microphone 12 senses the detected voice value and then outputs it together with the audio data. The client apparatus 1 receives chat streaming data (image data packets and audio data packets) transmitted from respective other client apparatus 1 that participate in the AV chat via the Internet 30.

<Main Structure of Client Apparatus>

Figure 2:
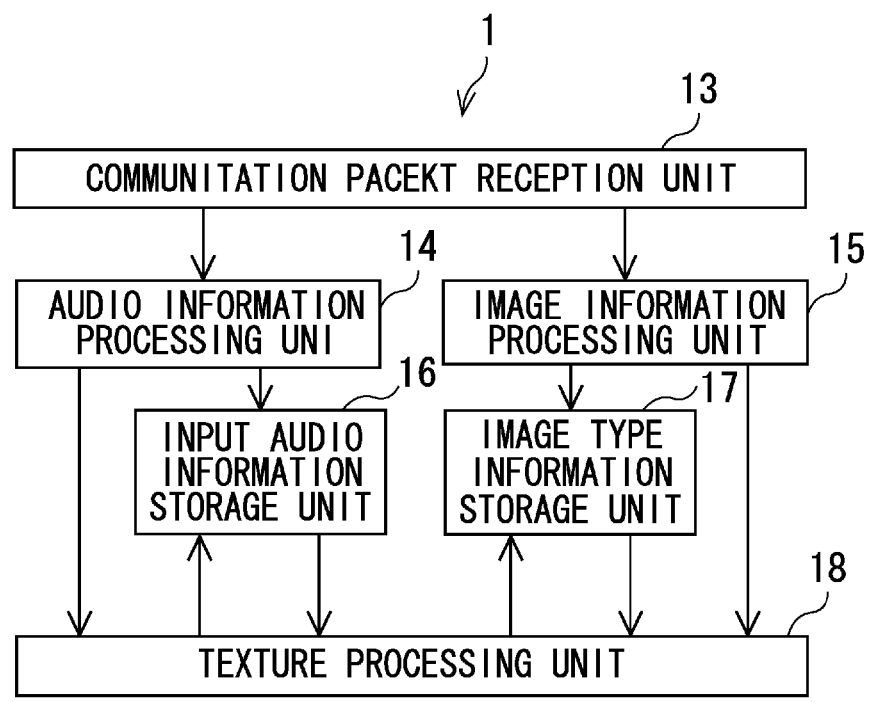
FIG. 2 is a block diagram showing a main structure of a client apparatus according to the present invention.

Next, referencing FIG. 2, a main structure of the client apparatus according to the present invention is described. FIG. 2 is a block diagram showing the main structure of the client apparatus according to the present invention.

The client apparatus 1 includes a communication packet reception unit 13, an audio information processing unit 14, an image information processing unit 15, an input audio information storage unit 16, an image type information storage unit 17, and a texture processing unit 18.

The communication packet reception unit 13 receives audio data packets transmitted from the client apparatus 1 of a user who participates in the AV chat, and then outputs the received audio data packets to the audio information processing unit 14. Moreover, the communication packet reception unit 13 receives image data packets transmitted from the client apparatus 1 of the user who participates in the AV chat, and then outputs the received image data packets to the image information processing unit 15.

The audio information processing unit 14 outputs to the texture processing unit 18 audio level information (detected voice value) included in the audio data packets input from the communication packet reception unit 13, and then updates and stores it in the input audio information storage unit 16.

The image information processing unit 15 outputs to the texture processing unit 18 image data included in image data packets input from the communication packet reception unit 13, and updates the image type information included in the image data packets and then stores the updated information in the image type information storage unit 17.

The texture processing unit 18 renders a chat image (texture) for displaying it on the monitor 10 while AV chatting. The chat image includes a self display image and a partner display image.

The self display image is a type of image set in each client apparatus 1. For example, when a video image from the video camera 11A is selected and set as a self display image in the client apparatus 1A, the texture processing unit 18 of the client apparatus 1A renders the video image input from the video camera 1A as a self display image. Furthermore, when an avatar or a picture prestored as a self display image in the client apparatus 1A is selected, the texture processing unit 18 of the client apparatus 1A reads out the avatar or the picture and then renders it as a self display image.

On the other hand, the partner display image is rendered based on the image data received by the communication packet reception unit 13 and then input from the image information processing unit 15. For example, when the user A of the client apparatus 1A AV chats with the user B of the client apparatus 1B, the texture processing unit 18 of the client apparatus 1A renders the partner display image of the user B based on the image data of the image data packets including user information received by the communication packet reception unit 13, wherein the user information specifies the user B. In the case where image data of image data packets including the user information that specifies the user B is video image data, a video image of the user B taken by the video camera 11B is rendered as a partner display image. Meanwhile, in the case of avatar image data, the avatar selected in the client apparatus 1B by the user B is rendered as the partner display image, and in the case of picture image data, the picture selected in the client apparatus 1B by the user B is rendered as the partner display image.

The texture processing unit 18 executes the aforementioned image rendering process, which is used in common regardless of image data type, when rendering the partner display image. In addition, it reads out image type information designating the type of the partner display image from the image type information storage unit 17, and then executes an image rendering process according to the image type information read out if necessary. Note that the image data type may be determined based on the image type information input from the image information processing unit 15 without providing the image type information storage unit 17.

When the image type information read out from the image type information storage unit 17 is a picture, processing for adding a square frame around the partner display image (picture) is performed.

Otherwise, when the image type information read out from the image type information storage unit 17 is an avatar, processing for reading out audio level information (detected voice value) from the input audio information storage unit 16 and then changing the state (transparency and size) of the partner display image (avatar) according to the detected voice value read out is performed. Specifically, whether the detected voice value is 9 or greater or less than 9 is determined. If it is 9 or greater, whether or not the present alpha value is 100% is determined. If the present alpha value is not 100% (less than 100%), the target alpha value is set to 100%. Otherwise, if the present alpha value is 100%, whether or not the present image size is 100% is determined. If the image size is 100%, the target image size is set to 70%. Otherwise, if the image size is less than 100%, the target image size is set to 100%. If the detected voice value is less than 9, the target alpha value is set to 80% and the target image size is set to 70%. Note that the texture processing unit 18 may render the partner display image according to the detected voice value directly input from the audio information processing unit 14.

The alpha value is a value that represents a ratio of transparency (translucency), which is a real value ranging between 0% and 100%. The alpha value of 100% represents a completely opaque state while 0% represents a completely transparent state. For example, when the avatar image data includes image data for only avatar and background image data for the same, the color of the avatar and color of the background are blended together according to the alpha value when rendering only the avatar.

Once the target alpha value and the target image size are set, the texture processing unit 18 executes an image rendering process in conformity with a prestored animation program so that the avatar image gradually reaches the target alpha value and the target image size (i.e., the present alpha value and the present image size are gradually changed so as to approach the target alpha value and the target image size.) Note that in the case where the present alpha value is already equal to the target alpha value, that alpha value is maintained. And in the case where the present image size is already equal to the target image size, that image size is maintained.

For example, in the case where the user A of the client apparatus 1A is AV chatting with the user B of the client apparatus 1B, when the user B speaks and input audio information having the detected voice value of 9 or greater is transmitted from the client apparatus 1B to the client apparatus 1A accordingly, the audio information processing unit 14 of the client apparatus 1A stores that input audio information in the input audio information storage unit 16, and the texture processing unit 18 reads out that input audio information from the input audio information storage unit 16, sets the target alpha value to 100%, and then renders a completely opaque avatar as a partner display image corresponding to the user B. Further, when the user B continues to speak and the input audio information having the detected voice value of 9 or greater continues to be transmitted to the client apparatus 1A from the client apparatus 1B accordingly, the audio information processing unit 14 of the client apparatus 1A stores that input audio information in the input audio information storage unit 16, and the texture processing unit 18 reads out that input audio information from the input audio information storage unit 16, sets the target alpha value to 70% if the present image size is 100%, and sets the target image size to 70% if the present image size is less than 100%. As a result, when the user B continues to speak and the input audio information having the detected voice value of 9 or greater continues to be transmitted to the client apparatus 1A from the client apparatus 1B accordingly, the texture processing unit 18 of the client apparatus 1A renders an avatar, which is completely opaque and the image size thereof is enlarged and reduced repeatedly between 70% and 100%, as a partner display image corresponding to the user B.

On the other hand, when the user B is silent and the input audio information having the detected voice value of less than 9 is transmitted to the client apparatus 1A from the client apparatus 1B accordingly, the audio information processing unit 14 of the client apparatus 1A stores that input audio information in the input audio information storage unit 16, and the texture processing unit 18 reads out that input audio information from the input audio information storage unit 16, sets the target alpha value to 80%, sets the target image size to 70%, and renders a semi-transparent avatar having a small image size as a partner display image corresponding to the user B.

When the set type is a picture, the texture processing unit 18 performs processing for adding a square frame around the self display image (picture) in the same manner as when rendering the aforementioned partner display image, so as to render the self display image. Also in the case where the set type is an avatar, processing for changing the state (transparency and size) of the self display image (avatar) according to the detected voice value is performed in the same manner as when rendering the aforementioned partner display image.

However, when rendering a self display image, the state of the avatar is changed using the detected voice value input from the microphone 12 connected to the client apparatus 1.

<An Example of Internal Circuit of Client Apparatus>

Figure 3:
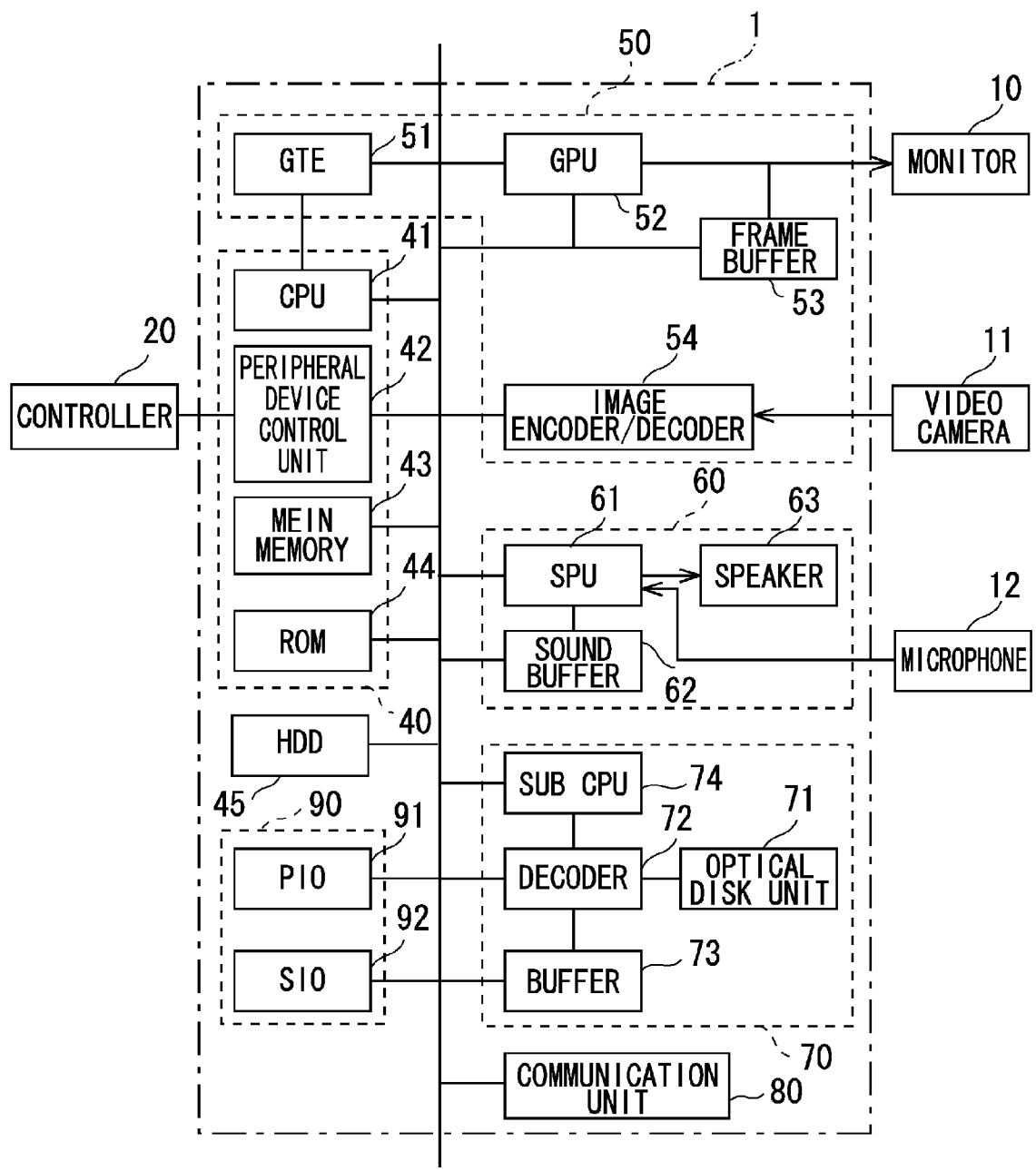
FIG. 3 is a block diagram exemplifying an internal circuit of a client apparatus having the structure shown in FIG. 2.

Next, referencing FIG. 3, an example of an internal circuit of a client apparatus having the aforementioned structure shown in FIG. 2 is explained. FIG. 3 is a block diagram exemplifying the internal circuit of the client apparatus.

It is constituted by a control unit 40, which includes a central processing unit (CPU) 41, peripheral devices and related devices, a hard disk drive (HDD) 45, a graphic system 50, which includes a graphics processing unit (GPU) 52 for rendering in a frame buffer 53 and related devices, a sound system 60, which includes a sound processing unit (SPU) 61 for providing musical sounds, sound effects or the like, an optical disk control unit 70 for controlling an optical disk on which application programs are recorded, a communication unit 80, an interface unit 90, and a bus to which respective components described above are connected. The CPU 41 functions as the audio information processing unit 14 and the image information processing unit 15, the GPU 52 functions as the texture processing unit 18, and the communication unit 80 functions as the communication packet reception unit 13.

The control unit 40 is constituted by the CPU 41, a peripheral device control unit 42 for controlling interrupts, direct memory access (DMA) transfers, etc., a main memory 43, which includes random access memory (RAM), and read only memory (ROM) 44. The main memory 43 functions as the input audio information storage unit 16 and the image type information storage unit 17.

Programs such as an operating system for controlling each component of the client apparatus 1, and application programs for implementing various functions are stored in the ROM 44. The CPU 41 controls the entirety of the client apparatus 1 by reading out the operating system stored in the ROM 44 to the main memory 43 and then executing the read-out operating system.

A variety of data, and a variety of application programs such as a program for implementing AV chats (hereafter referred to as AV chat program) are stored in the HDD 45. Avatar and/or picture image data selectable as a self display image is also stored in the HDD 45. The AV chat program includes an animation program, which is used when rendering an avatar as a self display image or a partner display image. The CPU 41 reads out the AV chat program stored in the HDD 45 to the main memory 43 and then executes the read-out AV chat program. Functions implemented thereby are described later in the "Operation" section.

The sound system 60 includes an SPU 61 for controlling audio signals under the control of the control unit 40, a sound buffer 62 stored with waveform data or related data for audio playback, and a speaker 63 for outputting musical sounds, sound effects or the like generated by the SPU 61. The sound system 60 receives an audio signal and the detected voice value output from the microphone 12. The sound system 60 converts the input audio signal to a digital signal, encodes it using an audio codec, and provides it to the communication unit 80. Audio data obtained via the Internet 30 is provided to the sound system 60 from the communication unit 80. The sound system 60 decodes the audio data using an audio codec, converts it to analog waveform data, stores it in the sound buffer 62, and provides it to the speaker 63.

The optical disk control unit 70 includes an optical disk unit 71, which reproduces programs, data or the like recoded on an optical disk, a decoder 72, which decodes programs, data or the like recoded together with an error correction code (ECC), for example, and a buffer 73, which is temporarily stored with data from the optical disk unit 71 so as to speed up data read out from the optical disk. A sub-CPU 74 is connected to the aforementioned decoder 72.

The interface unit 90 includes a parallel I/O interface (PIO) 91 and a serial I/O interface (SIO) 92. These are interfaces for connecting a memory card not shown in the drawing to the client apparatus 1.

The graphic system 50 includes a geometry transfer engine (GTE) 51, a GPU 52, a frame buffer 53, and an image encoder/decoder 54.

The GTE 51 includes, as an example, a parallel operating mechanism of executing multiple operations in parallel, and carries out coordinate transformation, calculates a light source, and calculates a matrix, a vector or the like in response to a calculation request issued by the aforementioned CPU 41. Afterwards, the control unit 40 defines a three dimensional model made up of a combination of basic shapes (polygons), such as triangles or squares, based on calculation results by the GTE 51 and sends to the GPU 52 a render command for each polygon for rendering a three dimensional image.

The GPU 52 renders a polygon in the frame buffer 53 in conformity with the render command from the control unit 40. The frame buffer 53 is stored with the image rendered by the GPU 52. This frame buffer 53 is constituted by dual-port RAM, which allows the GPU 52 to render or the main memory 43 to transfer and read out for displaying in parallel. In addition, this frame buffer 53 includes a CLUT region stored with a color look up table (CLUT), which is accessed by the GPU 52 when rendering a polygon or the like, and a texture region stored with a material (texture) to be inserted (mapped) to a polygon or the like, which is subjected to coordinate conversion and rendered by the GPU 52 when being rendered, as well as a display region, which provides a video output. These CLUT region and texture region are changed dynamically according to the update of the display region or the like.

The image encoder/decoder 54 encodes or decodes a still image or a moving image, or subjects it to digital or analog conversion or other various processing under the control of the aforementioned control unit 40.

Avatar or picture image data read out from the HDD 45 by the control unit 40 or a video signal from the video camera 11 is provided to this graphic system 50. When a video image is selected and set as a self display image, the graphic system 50 subjects the video signal to digital conversion, encodes (compresses) it using a video codec, and provides it to the communication unit 80. Moreover, it provides the converted digital video signal to the monitor 10. Furthermore, when an avatar or picture is selected and set as a self display image, the graphic system 50 encodes the avatar or picture image data read out from the HDD 45 using a video codec in the same manner as described above, and then provides it to the communication unit 80 as well as the monitor 10. At this point, when a picture is set as a self display image, the aforementioned frame is rendered onto image data read out from the main memory 43, and then the resulting image data is provided to the monitor 10. On the other hand, when an avatar is set as a self display image, the image data read out from the main memory 43 is subjected to a specific processing according to the detected voice value, and the resulting image data is provided to the monitor 10. Note that provision of avatar or picture image data to the communication unit 80 may be carried out by the control unit 40 instead of the graphic system 50. The image data obtained via the Internet 30 is provided to the graphic system 50 from the communication unit 80, and the graphic system 50 then provides this image data to the monitor 10. Note that when the image data provided from the communication unit 80 is encoded (compressed) using a video codec, the graphic system 50 decodes (decompresses) the provided image data using a video codec, converts it to analog image data, and then provides it to the monitor 10. When the image data type is picture, the image data is subjected to processing for rendering the aforementioned frame thereon and then the resulting image data is provided to the monitor 10. On the other hand, when the image data type is avatar, the image data is subjected to a specific processing according to the detected voice value and the resulting image data is then provided to the monitor 10.

The communication unit 80 controls data communication with other information processing units via the Internet 30 under the control of the control unit 40. The communication unit 80 packetizes image data for a self display image provided from the HDD 45 or the graphic system 50 (video camera 11), image type information, which designates the type of the image data, user information, which identifies a user, into image data packets. It then transmits via the Internet 30 the generated image data packets as chat streaming data to another client apparatus 1 participating in the AV chat. Furthermore, the communication unit 80 packetizes the audio data and the detected voice value provided from the sound system 60 (microphone 12) and the user information for identifying a user, thereby generating audio data packets. It then transmits via the Internet 30 the generated audio data packets as chat streaming data to another client apparatus 1 participating in the AV chat. Moreover, the communication unit 80 receives the chat streaming data (image data packets and audio data packets) transmitted via the Internet 30 from another client apparatus 1 participating in the AV chat, provides the image data to the graphic system 50, and then provides the audio data to the sound system 60. When the communication unit 80 receives image data packets, the CPU 41 stores the image type information and the user information, which are included in the image data packets and associated with each other, in the main memory 43. On the other hand, when the communication unit 80 receives audio data packets, the CPU 41 stores the audio level information (detected voice value) and the user information, which are included in the audio data packets and associated with each other, in the main memory 43.

<Structure of Server Apparatus>

Figure 4:
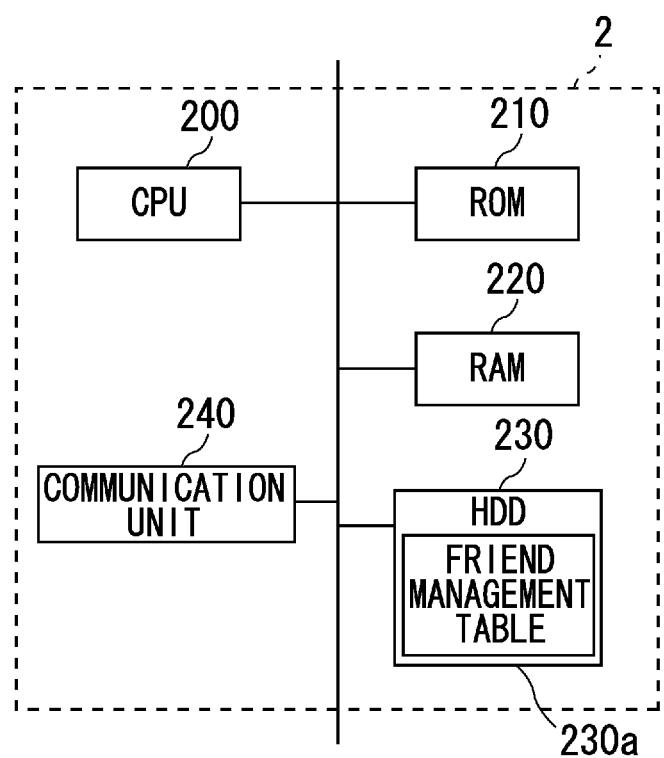
FIG. 4 is a block diagram showing an internal structure of a server apparatus according to the embodiment.

Next, referencing FIG. 4, a main internal structure of the server apparatus is described. FIG. 4 is a block diagram exemplifying a main internal structure of the server apparatus.

The server apparatus 2 is constituted by a CPU 200, ROM 210, RAM 220, a hard disk drive (HDD) 230, and a communication unit 240, all of which are connected via a bus.

The ROM 210 is stored with an operating system, which controls respective units of the server apparatus 2, and a variety of programs. The CPU 200 controls the respective units of the server apparatus 2 by reading out the operating system stored in the ROM 210 to the RAM 220 when the server apparatus 2 is started, and executing the read out operating system.

The communication unit 240 controls data communication via the Internet 30 under the control of the CPU 200.

The HDD 230 is stored with a friend management table 230a. The friend management table 230a is stored with user information of a user allowed to utilize the AV chat system SYM, and friend information associated with the user information. Note that a user follows a predetermined procedure to utilize the AV chat system SYM, resulting in storing the user information for the user in the friend management table 230a.

Herein, it is assumed that the pieces of user information for respective users A, B, and C of the client apparatus 1 1A, 1B, and 1C are prestored in the friend management table 230a. The user information is information for identifying users, and includes, for example, user IDs for identifying respective users specifically, user email addresses, user nicknames, avatars selected by users, and other related information. The friend information designates other users whose friends are preregistered by users, showing user information for the other users. Registration of friends is carried out in the following manner: Once the user of the client apparatus 1 has run a predetermined operation via the controller 20, the client apparatus 1 carries out data communication with the server apparatus 2 and another client apparatus 1 of another user registered as a friend, receives data to the effect that registration from the client apparatus 1 of the other user is granted, and thus registers the user information of the other user as friend information.

(2) Operation

Next, an operation of the embodiment is described.

Note that once a power source (not shown in the drawing) of the client apparatus 1 is turned on, a program such as an operating system stored in the ROM 44 is read out to the main memory 43 and then executed by the CPU 41, and when a command is entered by a user, a variety of programs read out to the main memory 43 from the ROM 44 or the optical disk mounted in the optical disk unit 71 are executed by the CPU 41, a variety of functions as described in the "Structure" section above are implemented.

On the other hand, once a power source (not shown in the drawing) of the client apparatus 2 is turned on, a program such as an operating system stored in the ROM 210 is read out to the RAM 220 and then executed by the CPU 200, and when a command is entered by a user, a variety of programs such as a game control program read out to the RAM 220 are executed by the CPU 200, a variety of functions as described in the "Structure" section above are implemented.

Note that with this embodiment, once a user gives a command of starting an AV chat or inviting another user through a client apparatus 1 or master of the multiple client apparatus 1 connected to the AV chat system SYM while the other user gives a command of accepting participation in the AV chat through another client apparatus 1, AV chatting is carried out between these client apparatus 1. In other words, these client apparatus 1 form a communication group to AV chat. Note that the master has a right to invite a participator. Herein, it is assumed that the client apparatus 1 selected as a master is the client apparatus 1A.

<Preparation for Starting AV Chat>

Figure 5:
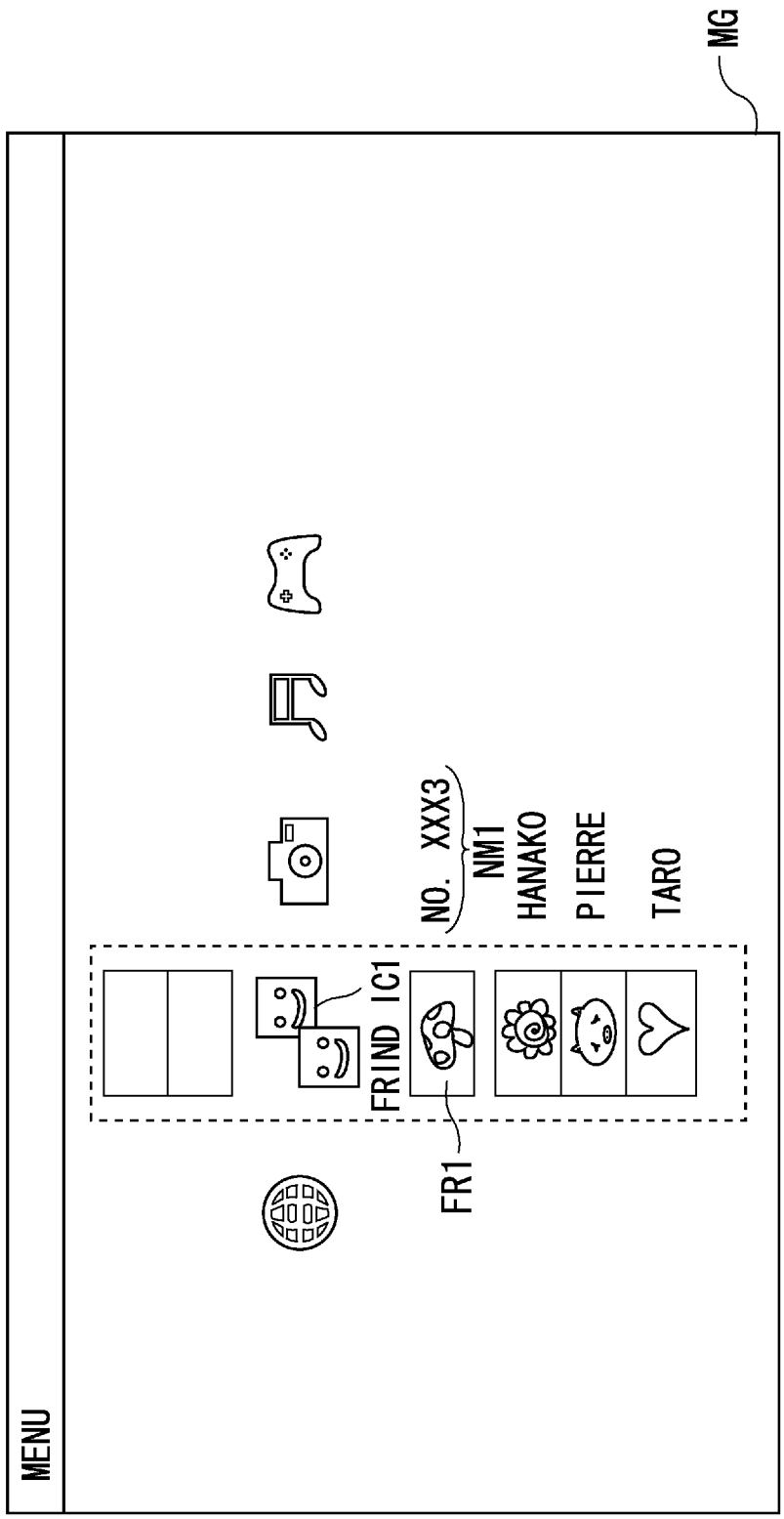
FIG. 5 exemplifies a menu screen according to the embodiment.

First, the user A operates a controller 20A connected to the client apparatus 1A so that a menu screen is displayed. A CPU 41A accesses the server apparatus 2 via a communication unit 80A, and transmits to the server apparatus 2 request data to the effect of requesting for friend information, which is stored associated with the user information of the user. This request data includes information such as user ID of the user A, for example. On the other hand, once the server apparatus 2 receives the request data transmitted from the client apparatus 1A, it refers to a friend management table 230a stored in the HDD 230 according to the request data, transmitting friend information associated with the user information of the user A to the client apparatus 1A. Once the CPU 41A of the client apparatus 1A receives the friend information transmitted from the server apparatus 2, it then issues a command of rendering a menu screen with this friend information to a graphic system 50A. The graphic system 50A renders an image for the menu screen in conformity with the render command. The CPU 41A provides to the monitor 10A a video signal for the rendered image for the menu screen. As a result, a menu screen MG as shown in FIG. 5, for example, is displayed on the monitor 10A. A chat icon IC1 symbolizing the function of AV chatting is displayed on the menu screen MG, and friend information preregistered by the user A and received from the server apparatus 2 is expanded and displayed in the vertical direction of the chat icon IC1. The displayed friend information is an avatar FR1 or a nickname NM1 of another user registered as a friend, for example. The user A operates the controller 20A to select from this friend information a conversation partner with whom the user A wants to start AV chatting. Afterwards, when the user A operates the controller 20A for displaying an option menu, an option menu (not shown in the drawing) is displayed on the right side of the menu screen MG Moreover, the user A operates the controller 20A to select 'start AV chat' from commands displayed in the option menu, thereby commanding to start AV chatting. In response thereto, the CPU 41A reads out an AV chat program from an HDD 45A and then executes it. Afterwards, the CPU 41A refers to the friend information selected by the user, generates an invitation message for a user corresponding to the friend information, and then displays it on the monitor 10A. More specifically, an invitation message template, for example, is prestored in the HDD 45A, and the CPU 41A reads out the invitation message template from the HDD 45A, and based thereon, adds information given by the friend information as an address or performs other operations so as to generate an invitation message. Such generated invitation message displayed on the monitor 10A is exemplified in FIG. 6.

Once the user A operates the controller 20 to instruct transmission of this invitation message, the client apparatus 1A transmits the invitation message to the client apparatus 1 (herein, client apparatus 1B) of the user of the destination of the invitation message (herein, user B) via the server apparatus 2.

In the case of the user A selecting a self display image for AV chatting, the user A operates the controller 20A to display a self display image selection screen (not shown in the drawing) on the monitor 10A. A group of selectable self display images (video image, avatar, and picture) are displayed on the self display image selection screen. When the user A then operates the controller 20A to specify and decide on one of the self display images, the self display image for the client apparatus 1A and the type thereof are set.

On the other hand, the client apparatus 1B that has received the invitation message transmitted by the client apparatus 1A displays the invitation message on a monitor 10B. The invitation message to be displayed on the monitor 10B is exemplified in FIG. 7. At this point, once the user B of the client apparatus 1B operates a controller 20B to command to participate in the AV chat, the client apparatus 1B reads out an AV chat program from an HDD 45B to main memory 43B and then executes it. The client apparatus 1B then transmits connectivity confirmation data to the client apparatus 1A so as to determine connectivity between itself and the client apparatus 1A. Once the client apparatus 1A receives the connectivity confirmation data transmitted from the client apparatus 1B, it transmits to the client apparatus 1B connectivity response data indicating to the effect that the connectivity confirmation data has been received.

Once the client apparatus 1B receives the connectivity response data, it determines to be connectable to the client apparatus 1A, and then transmits to the client apparatus 1A participation response data, which indicates to the effect that it is supposed to participate in the AV chat. Note that this participation response data includes the user ID for the user B and the like.

Note that in the case of the user B selecting a self display image for AV chatting, the user B operates the controller 20B in the same manner as in the case of the user A to display a self display image selection screen (not shown in the drawing) on the monitor 10B. A group of selectable self display images (video image, avatar, and picture) are displayed on the self display image selection screen. When the user B then operates the controller 20B to specify and decide on one of the self display images, the selected self display image for the client apparatus 1B and the type thereof are set.

Figure 8:
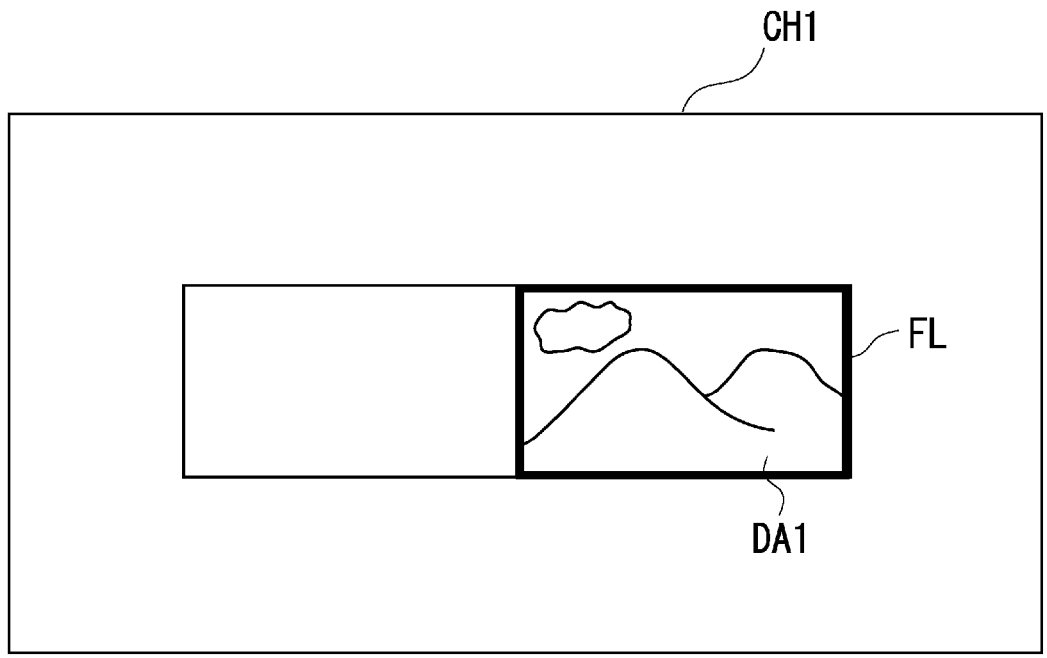
FIG. 8 exemplifies a chat screen according to the embodiment.

Afterwards, once the client apparatus 1A receives the resulting response data transmitted from the client apparatus 1B, it transmits to the client apparatus 1B start command data to the effect of commanding to start AV chatting. Moreover, the client apparatus 1A displays on the monitor 10 a chat screen CH1 as shown in FIG. 8. In the chat screen CH1, a self display image DA1 set in the client apparatus 1A is displayed on the right side of the screen. At this point, if the set self display image is a video image, a video image corresponding to a video signal input from a video camera 11A connected to the client apparatus 1A is displayed. Otherwise, if it is an avatar, an image of a selected avatar is displayed, whereas if is a picture, image of the selected picture is displayed. FIG. 8 shows the case where a picture of a mountain scene is selected. Transmission of image data from the client apparatus 1B is awaited, so as to display on the left side of the screen a video image corresponding to the image data transmitted from the client apparatus 1B described above. The client apparatus 1A transmits image data packets and audio data packets to the client apparatus 1B via the communication unit 80A.

On the other hand, once the client apparatus 1B receives the start command data transmitted from the client apparatus 1A, it displays a chat screen on the monitor 10B. In the chat screen, the self display image set in the client apparatus 1B is displayed on the right side of the screen. Transmission of image data from the client apparatus 1A is awaited, so as to display on the left side of the screen a video image corresponding to the image data transmitted from the client apparatus 1A described above. The client apparatus 1B transmits image data packets and audio data packets to the client apparatus 1A via a communication unit 80B.

Figure 9:
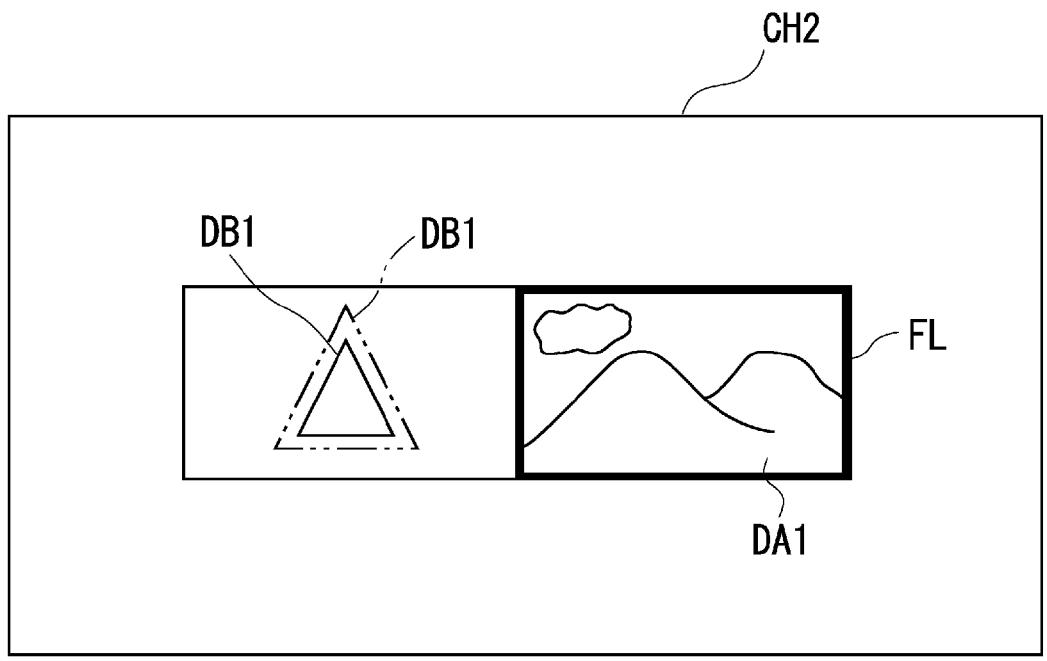
FIG. 9 exemplifies a chat screen according to the embodiment.

Each client apparatus 1 displays on the right side of the screen the self display image set in itself, and displays on the left side of the screen the partner display image represented by image data transmitted from another apparatus. In the case where a picture of a mountain scene, for example, is selected as a self display image in the client apparatus 1A while an avatar is selected as a self display image in the client apparatus 1B, a chat screen CH2 is displayed on the monitor 10A, where a self display image (picture of a mountain scene) DA1 is arranged on the right side, and a partner display image (avatar) DB1 is arranged on the left, as shown in FIG. 9.

<Processing for Specific Types of Self Display Images and Partner Display Images>

Next, processing for specific types of self display images and partner display images is described.

When the type of self display image set in itself is a picture, the client apparatus 1A displays on the monitor 10A the chat screen CH1 in which a frame FL is rendered around the self display image (picture) DA1. On the other hand, when the type of the self display image set in the client apparatus 1B or AV chat partner is a picture, the client apparatus 1A receives image type identification information designating the picture from the client apparatus 1B, and then displays on the monitor 10A a chat screen (not shown in the drawing) in which a frame is rendered around the partner display image (picture).

When displaying a picture as a self display image or a partner display image on the monitor 10A, the graphic system 50A of the client apparatus 1A performs the following processing. First, picture image data for the self display image provided from the HDD 45 or an image corresponding to picture image data for the partner display image received from the client apparatus 1B is rendered in the texture region of the frame buffer 53. This image is rendered in the texture region, the size covering the entire display region for the self display image or the partner display image in the chat screen. The image rendered in the texture region is reduced to a size resulting from subtracting the outer region, in which a frame is to be rendered, from the display region for the self display image or the partner display image in the chat screen, and is mapped in the display region of the frame buffer 53, and the image for the frame is also mapped in the display region. As a result, the reduced picture and frame image are combined in the display region.

When the type of self display image set in itself is an avatar, the client apparatus 1A displays on the monitor 10A a chat screen (not shown in the drawing) in which the state (transparency and size) of the self display image (avatar) is changed according to the detected voice value, which is detected by the microphone 12A. On the other hand, when the type of self display image set in the client apparatus 1B or AV chat partner is an avatar, the client apparatus 1A receives from the client apparatus 1B image type identification information designating the avatar, and the detected voice value (voice level information) detected by the microphone 12B, and then displays on the monitor 10A a chat screen (CH2 shown in FIG. 9 or CH3 shown in FIG. 10) in which the state (transparency and size) of the partner display image (avatar) is changed according to the received detected voice value.

Figure 11:
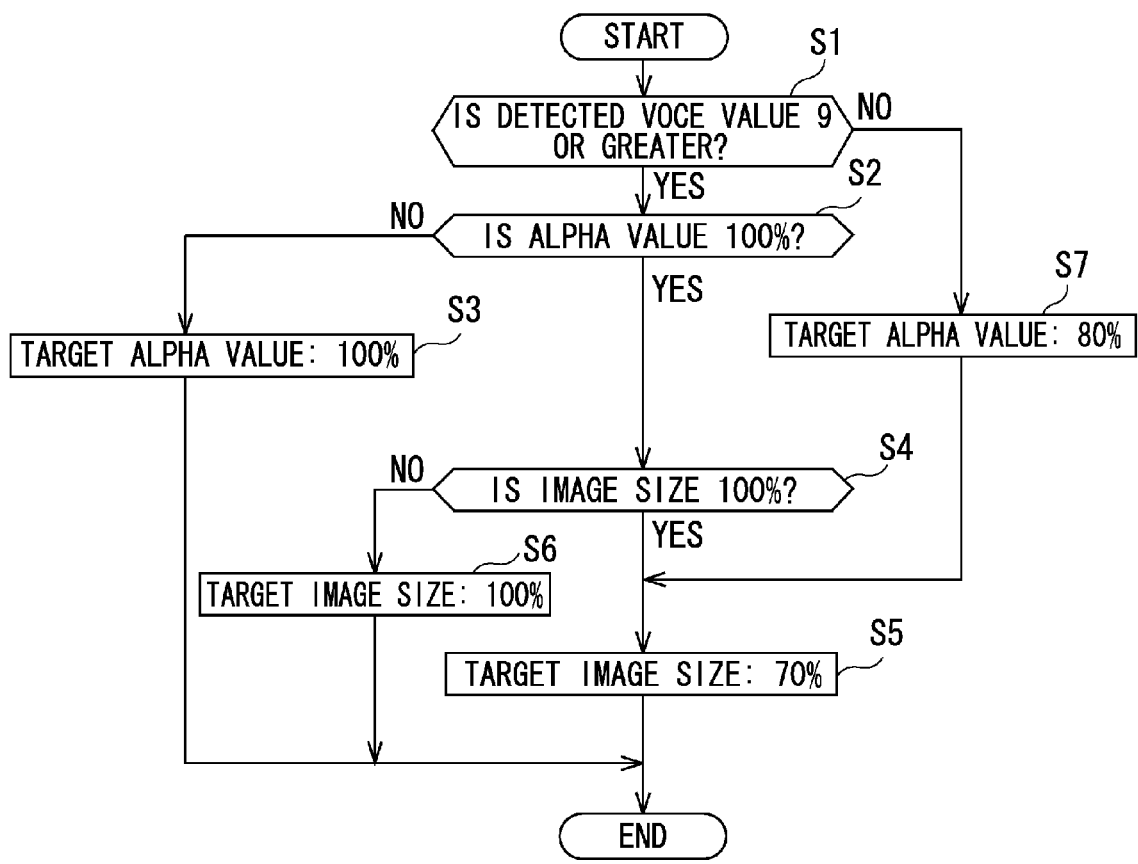
FIG. 11 shows a flowchart describing a rendering process according to the embodiment.

In other words, as shown in FIG. 11, when the self display image is an avatar and/or when the partner display image is an avatar, whether the detected voice value is 9 or greater or less than 9 is determined (step S1). If it is 9 or greater (Yes in step S1), whether or not the present alpha value is 100% is determined (step S2). If the present alpha value is not 100% (less than 100%) (No in step S2), the target alpha value is set to 100% (step S3). Otherwise, if the present alpha value is 100% (Yes in step S2), whether or not the present image size is 100% is then determined (step S4). If the image size is 100% (Yes in step S4), the target image size is set to 70% (step S5). Otherwise, if the image size is less than 100% (No in step S4), the target image size is set to 100%. On the other hand, if the detected voice value is less than 9 (No in step SI), the target alpha value is set to 80% (step S7) and the target image size is set to 70% (step S5). When the target alpha value and the target image size are set, an avatar image gradually approaching those equal to the target image alpha and the target image size is displayed on the monitor 10 according to a prestored animation program. According to this animation program, alpha values and display sizes for the self display image and /or the partner display image being displayed at present are stored, and the self display image and/or the partner display image is changed for a predetermined period of time (750 milliseconds, for example) until the predetermined target alpha value and/or the target display size is reached. At this point, processing for raising (increasing) the alpha value is performed before processing for changing the image size, and therefore changing the display size is started after the target alpha value is reached. On the other hand, processing for lowering (decreasing) the alpha value and processing for changing the image size are performed in parallel.

When displaying an avatar as a self display image or a partner display image on the monitor 10A, the graphic system 50A of the client apparatus 1A performs the following processing. First, an avatar image data for the self display image provided from the HDD 45 or avatar image data for the partner display image received from the client apparatus 1B is rendered in the texture region of the frame buffer 53. This image is rendered in the texture region, the size (image size) covering the entire display region for the self display image or the partner display image in the chat screen. The image rendered in the texture region is subjected to processing for reducing the color darkness according to the predetermined target alpha value and/or target image size, thereby being mapped in the display region of the frame buffer 53. At this point, since the avatar image data not only includes the image data of a lone avatar (avatar only) but also image data of the background thereof, reducing the size of the entire avatar image including the lone avatar and the background and then mapping the resulting image in a render region causes the size of the entire avatar image to be smaller than the display region for the self display image or the partner display image in the chat screen, resulting with blank regions generated therearound, which may make users feel something is strange. Therefore, with the processing for reducing the image size described above, a background color is rendered in the display region of the frame buffer 53 in advance, and the entire avatar image is reduced and then rendered thereon. As a result, since the background color is always drawn on the blank region, users do not feel anything is strange. Meanwhile, the processing for decreasing the color darkness described above mixes (blends) the color of the lone avatar with the background color according to the alpha value.

Figure 10:
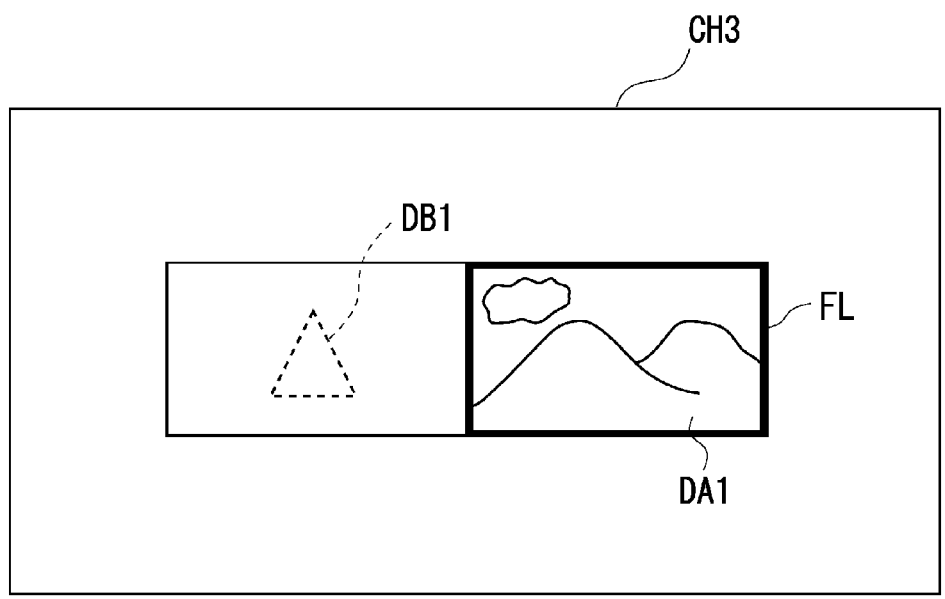
FIG. 10 exemplifies a chat screen according to the embodiment.

In the case where the user A of the client apparatus 1A AV-chats with the user B of the client apparatus 1B, and when an avatar is selected as a self display image in the client apparatus 1B and input audio information including the detected voice value of 9 or greater is then transmitted continuously to the client apparatus 1A from the client apparatus 1B, the alpha value is determined not to be 100% for the duration until the alpha value reaches 100% in step S2, and the target alpha value of 100% is maintained (step S3). Therefore, an avatar is displayed as a partner display image for the user B on the monitor 10A such that the color darkness of the avatar gradually changes to be darker from the initial semi-transparent state to ultimately be completely opaque, with the display size unchanged. When the user B further continues to speak and input audio information including the detected voice value of 9 or greater continues to be transmitted to the client apparatus 1A from the client apparatus 1B accordingly, the target image size is set to 100% if the resent image size is less than 100%. Otherwise, if the image size has reached 100% already, the target image size is set to 70%. Therefore, as shown in FIG. 9, an avatar DB1 is rendered as a partner display image for the user B in the chat screen CH2 of the monitor 10A such that the avatar is completely opaque continues to be enlarged and reduced repeatedly between the image sizes 70% (shown by solid lines in FIG. 9) and 100% (shown by chain double-dashed lines in FIG. 9). On the other hand, when the user B stop speaking and input audio information including the detected voice value of less than 9 is transmitted continuously to the client apparatus 1A from the client apparatus 1B accordingly, the target alpha value is then set to 80%. Therefore, as shown in FIG. 10, the avatar DB1 is displayed in the chat screen CH3 of the monitor 10A while the size of the avatar is reduced gradually until the image size is 70%, and the alpha value is being gradually changed up to 80%, resulting in a semi-transparent avatar. Therefore, when the self display image and/or the partner display image is an avatar, the avatar having the image size of 70% and the alpha value of 80% is displayed in the initial chat screen of AV chatting. Note that FIGS. 9 and 10 exemplify the case where a triangle is selected as an avatar for simplification of illustration.

Thus, when the partner display image is an avatar, observing the state of the displayed avatar allows recognition of whether the partner is speaking or not. Moreover, an avatar image is displayed while the size of the avatar is changed after the present alpha value is changed along with speech of the partner and reaches the target alpha value, and therefore, even if a sudden sound (noise) other than speech enters the microphone 12, only the present alpha value is changed for the duration until the present alpha value reaches the target alpha value, with the image size maintained as is, thereby minimizing the sense of strangeness that users looking at the partner display image may feel. Furthermore, when the conversation partner continues to speak, the size of the partner display image is changed periodically. Therefore, the partner display image may function as a message for visibly prompting users who are looking at the image to listen to the partner.

In such a manner according to the embodiment, when a picture is selected as a self display image, or image data of a picture is transmitted as a partner display image, a picture image to which a frame is attached is displayed as the self display image or the partner display image in the chat screen of the monitor 10.

On the other hand, when an avatar is selected as a self display image, the avatar, which is changed according to the state of the user's voice (detected voice value), is displayed as the self display image in the chat screen of the monitor 10.

Meanwhile, when avatar image data is transmitted as a partner display image, the avatar, which is changed according to the state of the partner's voice (detected voice value), is displayed as a partner display image in the chat screen of the monitor 10.

Therefore, it is possible to catch user's interest on the chat screen while voice chatting.

MODIFIED EXAMPLES

Modified Example 1

The types of self display image and/ or partner display image are not limited to only three types: video image, avatar, and picture as described above, and may be other types of images such as a moving image stored in the client apparatus 1 or a game image executed by the client apparatus 1. When these other types of images are displayed as a self display image and/or a partner display image, a rendering process for those types may be added. For example, when a moving image is used as a self display image and/or a partner display image, a square frame may be added around the self display image and/or the partner display image (moving image), as in the case of the picture described above. Furthermore, a frame for the moving image may be prepared with a different shape from that for the picture. On the other hand, when a game image is used as a self display image and/or a partner display image, a message (e.g., words such as 'game in session') for informing the conversation partner to the effect of chatting while playing a game may be rendered in a region (e.g., upper side) of the game image.

Modified Example 2

If the frequency of executing the processing (steps S1 through S7) in FIG. 11 does not balance with the rate of image size change for the self display image or the partner display image, the image size may hardly change at all. For example, in the case where an avatar is displayed as a partner display image, and when the detected voice value is kept at 9 or greater continuously, the alpha value has already reached 100%, and the present image size is 100%, reception of image data packets results in the target image size being set to 70% (step S5), and then the size of the avatar image being reduced gradually. At this point, upon reception of the next data packet when the avatar is hardly reduced, it is determined that the image size is not 100% (No in step S4), and then the target image size is set to 100% (step S6). As a result, the avatar image does not reach the target image size of 70%, and is enlarged after it is slightly reduced. In order to solve such an inconvenience, whether or not the avatar image is now being enlarged is determined in step S5. If it is now being enlarged, the target image size may be maintained at 100% without changing to 70%. In the same manner, whether or not the avatar image is now being reduced is determined in step S6. If it is now being reduced, the target image size may be maintained at 70% without changing to 100%.

Modified Example 3

According to the processing in step S1 of FIG. 11, even if it is determined that the detected voice value is 9 or greater only once or sporadically, processing proceeds to step S2. Therefore, display of the avatar may be changed even when a sudden sound (noise) other than the user's speech enters the microphone 12. In order to solve such a inconvenience, only if the detected voice value of 9 or greater continues for a predetermined number of times (e.g., four times) in step S1, processing proceeds to step S2, and if the detected voice value of less than 9 is included in the previous continuous predetermined number of times, processing may proceed to step S7.

Modified Example 4

According to the processing in step S1 of FIG. 11, even if it is determined that the detected voice value is 9 or greater only once or sporadically, processing proceeds to step S7. Therefore, display of the avatar may be changed even if the user's speech breaks for a split second. In order to solve such an inconvenience, only if the detected voice value of less than 9 continues for a predetermined number of times (e.g., four times) in step S1, processing proceeds to step S7, and if the detected voice value of 9 or greater is included in the previous continuous predetermined number of times, processing may proceed to step S2.

Modified Example 5

In step S2 of FIG. 11, whether or not the present alpha value is 100% is determined. Therefore, the image size is not changed for the duration until the alpha value reaches 100%. As a result, it may take time until the avatar image size is changed (enlarged) from when the user starts speaking. In order to solve such an inconvenience, the alpha value may be set to less than 100% (e.g., 90%), which is a criterion in step S2.

Modified Example 6

The microphone 12 of the embodiment described above is a monaural type, and the number of the detected voice value entering the client apparatus 1 together with audio data is one.

However, the number of the detected voice value entering together with the audio data may be plural (e.g., two). In this case, if at least one of detected multiple voice values is 9 or greater in step S1, processing may proceed to step S2. Otherwise, if the number of those of 9 or greater is a predetermined number or greater, processing may proceed to step S2.

Modified Example 7

In the case of using stereo microphones, which detect respectively detected stereo voice values and transmit them together with audio data to the client apparatus 1, if the self display image and/or the partner display image is, for example, an avatar, the detected stereo voice values are compared, and the avatar may be moved towards the side of the larger voice value on the chat screen. In this case, the larger the difference therebetween, the greater the travel distance or the travel speed may be set.

While the preferred embodiment of the present invention has been described using specific terms, such description is for illustrative purposes, and it is to be understood that changes and variations may be made without departing from the spirit or scope of the following claims.

The content of Application No. TOKUGAN 2007-188109 which was filed in Japan on Jul. 19, 2007 and on which the claim to priority for this application is based, is hereby incorporated by reference.

What is claimed is:

1. A communication system and a first and a second communication apparatus, include a processor and a memory, connected to a network, wherein:
said first communication apparatus, comprises:
an audio input unit; and
a transmitter, which transmits to the second communication apparatus image data designating a user of the first communication apparatus, audio data for a voice entered from the audio input unit, the audio data including voice level information that designates an input level of the voice and that designates a detected voice value, and image type information designating a type of the image data selected from a plurality of image types, where the plurality of image types include at least two of the following types of images: video image, avatar image, and picture image, and where the image data and the image type information are associated with one another and the image data is arranged in an identical data structure for all image types and then transmitted over the network, and
said second communication apparatus, comprises:
a receiver, which receives the image data, the audio data, and the image type information transmitted from the first communication apparatus,
an audio output control unit, which outputs from an audio output unit a voice represented by the audio data received, and
a display control unit, which displays on a display screen an image for the image data received, the display control unit:
(i) when the image type information received is information designating a predetermined image type, subjects the image to a predetermined rendering process corresponding to the predetermined image type and then displays the resulting image,
(ii) when the image type information received is information designating an avatar image, determines whether or not the detected voice value is a predetermined value or greater,
(iii) when the detected voice value is the predetermined value or greater, compares a present alpha value for a present avatar image that is already displayed to a predetermined first value,
(iv) when the present alpha value is less than the predetermined first value, changes the present avatar image in accordance with gradually changing the present alpha value to reach the predetermined first value,
(v) when the present alpha value is at least equal to the predetermined first value, changes the present avatar image such that an image size gradually reaches a maximum size, and
(vi) when the detected voice value is less than the predetermined value, changes the present avatar image in accordance with gradually changing the present alpha value to reach a predetermined second value and for the image size to reach a predetermined minimum size smaller than the maximum size.

2. The communication system according to claim 1, wherein the display control unit performs a common image rendering process to the received image data regardless of the image type of the image data, and the display control unit, when the image type information received is information designating the predetermined image type, adds a predetermined rendering process corresponding to the predetermined image type to the common image rendering process and then displays the resulting image.

3. The communication system according to claim 1, wherein the display control unit, when the image type information received is information designating a picture, adds a frame around a picture image for the image data and displays the resulting image in the display screen.

4. A communication apparatus, including a processor and a memory, connected to a network, comprising:
a receiver, which receives image data, audio data, and image type information, which have been transmitted from another communication apparatus connected to the network, where the image type information designates a type of the image data selected from a plurality of image types, where the plurality of image types include at least two of the following types of images: video image, avatar image, and picture image, where the image data and the image type information are associated with one another and the image data has identical data structure for all image types, and where the audio data is for a voice entered from an audio input unit of the other communication apparatus, the audio data including voice level information that designates an input level of the voice and that designates a detected voice value;
an audio output control unit, which outputs from an audio output unit a voice represented by the audio data received; and
a display control unit, which displays on a display screen an image for the image data received, the display control unit:
(i) when the image type information received is information designating a predetermined image type, subjects the image to a predetermined rendering process corresponding to the predetermined image type and then displays the resulting image,
(ii) when the image type information received is information designating an avatar image, determines whether or not the detected voice value is a predetermined value or greater, (iii) when the detected voice value is the predetermined value or greater, compares a present alpha value for a present avatar image that is already displayed to a predetermined first value, (iv) when the present alpha value is less than the predetermined first value, changes the present avatar image in accordance with gradually changing the present alpha value to reach the predetermined first value, (v) when the present alpha value is at least equal to the predetermined first value, changes the present avatar image such that an image size gradually reaches a maximum size, and (vi) when the detected voice value is less than the predetermined value, changes the present avatar image in accordance with gradually changing the present alpha value to reach a predetermined second value and for the image size to reach a predetermined minimum size smaller than the maximum size.

5. The communication apparatus according to claim 4, wherein the display control unit performs a common image rendering process to the received image data regardless of the image type of the image data, and the display control unit, when the image type information received is information designating the predetermined image type, adds a predetermined rendering process corresponding to the predetermined image type to the common image rendering process and then displays the resulting image.

6. The communication apparatus according to claim 4, wherein the display control unit, when the image type information received is information designating a picture, adds a frame around a picture image for the image data and displays the resulting image in the display screen.

7. A non-transitory, computer-readable storage medium having stored thereon a communication program, which instructs a computer, to perform a predetermined processing, said predetermined processing comprising:

receiving, at the computer, image data, audio data, and image type information, which have been transmitted from another communication apparatus via a network, where the image type information designates a type of the image data selected from a plurality of image types, where the plurality of image types include at least two of the following types of images: video image, avatar image, and picture image, where the image data and the image type information are associated with one another and the image data has been arranged in an identical data structure for all image types and then transmitted over the network, and where the audio data is for a voice entered from an audio input unit of the other communication apparatus, the audio data including voice level information that designates an input level of the voice and that designates a detected voice value, displaying an image for the image data received on a display screen, and outputting a voice represented by the audio data received from an audio output unit; wherein the displaying step includes:

(i) when the image type information received is information designating a predetermined image type, subjecting the image to a predetermined rendering process corresponding to the predetermined image type and then displays the resulting image, (ii) when the image type information received is information designating an avatar image, determining whether or not the detected voice value is a predetermined value or greater, (iii) when the detected voice value is the predetermined value or greater, comparing a present alpha value for a present avatar image that is already displayed to a predetermined first value, (iv) when the present alpha value is less than the predetermined first value, changing the present avatar image in accordance with gradually changing the present alpha value to reach the predetermined first value, (v) when the present alpha value is at least equal to the predetermined first value, changing the present avatar image such that an image size gradually reaches a maximum size, and (vi) when the detected voice value is less than the predetermined value, changing the present avatar image in accordance with gradually changing the present alpha value to reach a predetermined second value and for the image size to reach a predetermined minimum size smaller than the maximum size.

8. The communication system according to claim 1, wherein the predetermined rendering process is based at least on the image type information associated with the received predetermined image.

9. The non-transitory, computer-readable storage medium of claim 7, wherein the displaying step includes: (i) performing a common image rendering process to the received image data regardless of the image type of the image data, and (ii) a step in which, when the image type information received is information designating a predetermined image type, adding a predetermined rendering process corresponding to the predetermined image type to the common image rendering process.

* * * * *